United States Patent
Ozamoto

(10) Patent No.: US 9,164,736 B2
(45) Date of Patent: Oct. 20, 2015

(54) DATA PROCESSING SYSTEM, INPUT SUPPORT METHOD, AND INPUT SUPPORT PROGRAM

(71) Applicant: Renesas Electronics Corporation, Kawasaki-shi, Kanagawa (JP)

(72) Inventor: Noboru Ozamoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 14/535,185

(22) Filed: Nov. 6, 2014

(65) Prior Publication Data

US 2015/0135162 A1    May 14, 2015

(30) Foreign Application Priority Data

Nov. 11, 2013    (JP) .................................. 2013-232885

(51) Int. Cl.
*G06F 9/44* (2006.01)
(52) U.S. Cl.
CPC .......................... *G06F 8/33* (2013.01)
(58) Field of Classification Search
CPC .......................................................... G06F 8/33
USPC ......................................... 717/110, 111, 112
See application file for complete search history.

(56) References Cited

U.S. PATENT DOCUMENTS

2014/0109043 A1* 4/2014 Bolotnikoff et al. .......... 717/113

FOREIGN PATENT DOCUMENTS

JP        1-118925  A      5/1989

* cited by examiner

*Primary Examiner* — Chameli Das
*Assistant Examiner* — Viva Miller
(74) *Attorney, Agent, or Firm* — McDermott Will & Emery LLP

(57) ABSTRACT

Guide information according to a hierarchy of a given character string is sequentially acquired in response to an input of character strings for describing a source program, and only the guide information is displayed depending on an input status of the character string. Characters input from an input device for software description are coupled with each other to create an input character string. The created input character string is divided for each of the number of hierarchies on the basis of the number of hierarchies sectioned by a member access operator indicative of an access to a member of a structure or a class to acquire hierarchical character strings and hierarchy numbers thereof. The corresponding hierarchy of the hierarchical database is searched with the hierarchical character string as a search key for each of the acquired hierarchy numbers.

18 Claims, 6 Drawing Sheets

DATA PROCESSING SYSTEM, INPUT SUPPORT METHOD, AND INPUT SUPPORT PROGRAM

CROSS-REFERENCE TO RELATED APPLICATIONS

The disclosure of Japanese Patent Application No. 2013-232885 filed on Nov. 11, 2013 including the specification, drawings and abstract is incorporated herein by reference in its entirety.

BACKGROUND

The present invention relates to a technique of dividing data sequentially input, and acquiring support information on input data from hierarchical database, for example, relates to a technique effectively applied to data processing for sequentially displaying support information such as description information on input codes when inputting the codes under an integrated development environment of software development.

Products that incorporate microcomputers thereinto are generalized. However, in recent years, with advanced functions of the products, a controlled variable by the microcomputer, that is, a scale of an embedded program incorporated into the products increases. Also, the development of the embedded program needs to be conducted while always referring to an enormous amount of hardware manual at the time of coding and at the time of debugging. For that reason, work for referring to the manual is required in addition to an increase in the scale of the program, and an improvement in the development efficiency is therefore desired. For example, a large number of registers (or control registers) are arranged for the purpose of conducting function settings on a peripheral module or a circuit module such as an accelerator which are incorporated into the microcomputer. When parameters for setting values for the respective bits of those registers are determined, an enormous amount of hardware manual is frequently referred to in order to refer to values of the respective bits of the register and their significances when determining the parameters for setting values for the respective bits of those registers.

Japanese Unexamined Patent Application Publication No. 1989-118925 discloses a method of guiding a program input as an input guide. Patent Literature 1 discloses a technique in which a guide of all parameter formats of the syntax is displayed in another area different from a program input area with a change in color or font between a current input portion and an uninput portion when depressing another specific function key after characters such as Do syntax in a functional language program such as an LISP (list processor) has been input. According to this technique, a list of the parameters of the program is checked at an arbitrary time point of an input process without the addition of the restriction of freedom to an input environment of the program having the free format, and an effective input of a correct parameter can be induced and supported. FIG. 3 of Japanese Unexamined Patent Application Publication No. 1989-118925 illustrates a display example of an insertion guide and an indirect guide of the parameters of the Do syntax in an LISP. The input guide illustrated in this publication is realized as one function of an editor. A screen configuration of a full screen editor is illustrated in which a header as the editor is displayed on a top line of a display screen, a message area is displayed on a second line, and a large area below the message area is set as a program input/edition area.

The full screen editor of this free format extracts a functional name or reserved words of the input program, or a command (collectively called "program language") and a parameter (argument) portion. A notation database that stores the guide characters of the parameters and a storage rule of the list of the parameters for each of the program languages is accessed. The notation rule is checked against the extracted input parameters (actual argument), and the guide character of the parameter corresponding to the uninput or short parameter is cut out, and inserted and displayed at a position to be input subsequently to the input program. In order to identify the inserted guide character, an arrangement position of the insertion guide is stored and managed in another guide attribute list different from a text of the input program.

In inputting the program with the use of the above editor, when the guide is required at the time of inputting a part of the programs to an input area of the programs, a range of the syntax is determined. Then, if the range of the function names and the individual parameters are extracted from a designated target range, the guide character of the parameter corresponding to the function name, and the notation rule are extracted from the notation database. The rotation rule is checked against the actual argument obtained in advance to check the excess and deficiency of the parameters, and the formats of the respective parameters. The guide character of the parameter corresponding to the short parameter portion is inserted at a position to be input subsequently to a text to display the guide. When another specific function key is depressed after inputting partial characters of the program, the guide of all the parameter formats of the syntax is displayed in another area different from the program input area as with the message area on the second line in the display screen. In the guide display, the current input portion and the uninput portion are displayed with different colors or fonts in the display character string.

SUMMARY

In the related art display guide of the program input, when the function is input, the input guide corresponding to the syntax of the function can be displayed, and the guide of the parameter corresponding to the input function is displayed in another message area different from the program display area.

However, under the circumstances in which with the complication of the programs and also an increase in the scale as of today, the program development needs to be conducted while always referring to an enormous amount of hardware manual, and work for referring to the manual is required in addition to an increase in the scale of the program so that an improvement in the development efficiency is desired, the present inventors have proved that the related art guide display of the program input is not sufficient. First, when the input guide of the parameters is displayed in another message area different from the program display area, if the amount of information on the input guide is large, the input guide cannot be displayed in another message area. If the message area for displaying the guide increases, a program input area available as the editor is reduced to narrow the area for displaying a source code, and an outlook of the program is deteriorated to degrade the production efficiency of the program. Second, even if the overall input guide of the parameter corresponding to the function is to be uniformly displayed according to the function, the input guide is not uniformly displayed. When only a part of the input guide is displayed in conformity to a size of the message area, the display is inferior to the guide function. If the types of registers and the types of parameters such as the bit names of the individual registers are enormous as with the parameter setting for the registers, the need to hierarchize the guide display, and newly develop a control technique for hierarchizing the guide display has been recognized by the present inventors.

The above and other problems and novel features will become apparent from the description of the present specification, and the attached drawings.

A typical outline of the embodiment disclosed in this application will be described in brief as follows.

That is, characters input from the input device for software description are coupled with each other to create an input character string. If the created input character string is the parameter of the program language, the input character string is divided for each of the number of hierarchies on the basis of the number of hierarchies sectioned by a member access operator indicative of an access to a member of a structure or a class to acquire hierarchical character strings and hierarchy numbers thereof. The corresponding hierarchy of the hierarchical database is searched with the hierarchical character string as a search key for each of the acquired hierarchy numbers. The guide information searched from the hierarchical database is displayed in a display together with the input character string in association with the hierarchical character string of the hierarchy number.

The advantages obtained by a typical one of the embodiments disclosed in the present application will be described in brief as follows.

That is, the guide information according to the hierarchy of a given character string can be sequentially acquired in response to an input of the character string for describing the source program, and only necessary guide information can be displayed depending on an input status of the character string. As a result, even if the program scale increases, or even if the manual of the hardware to be developed in program is enormous, work for referring to the manual can be omitted, and the development efficiency can be improved.

DETAILED DESCRIPTION

1. Outline of Embodiment

Figure 1:
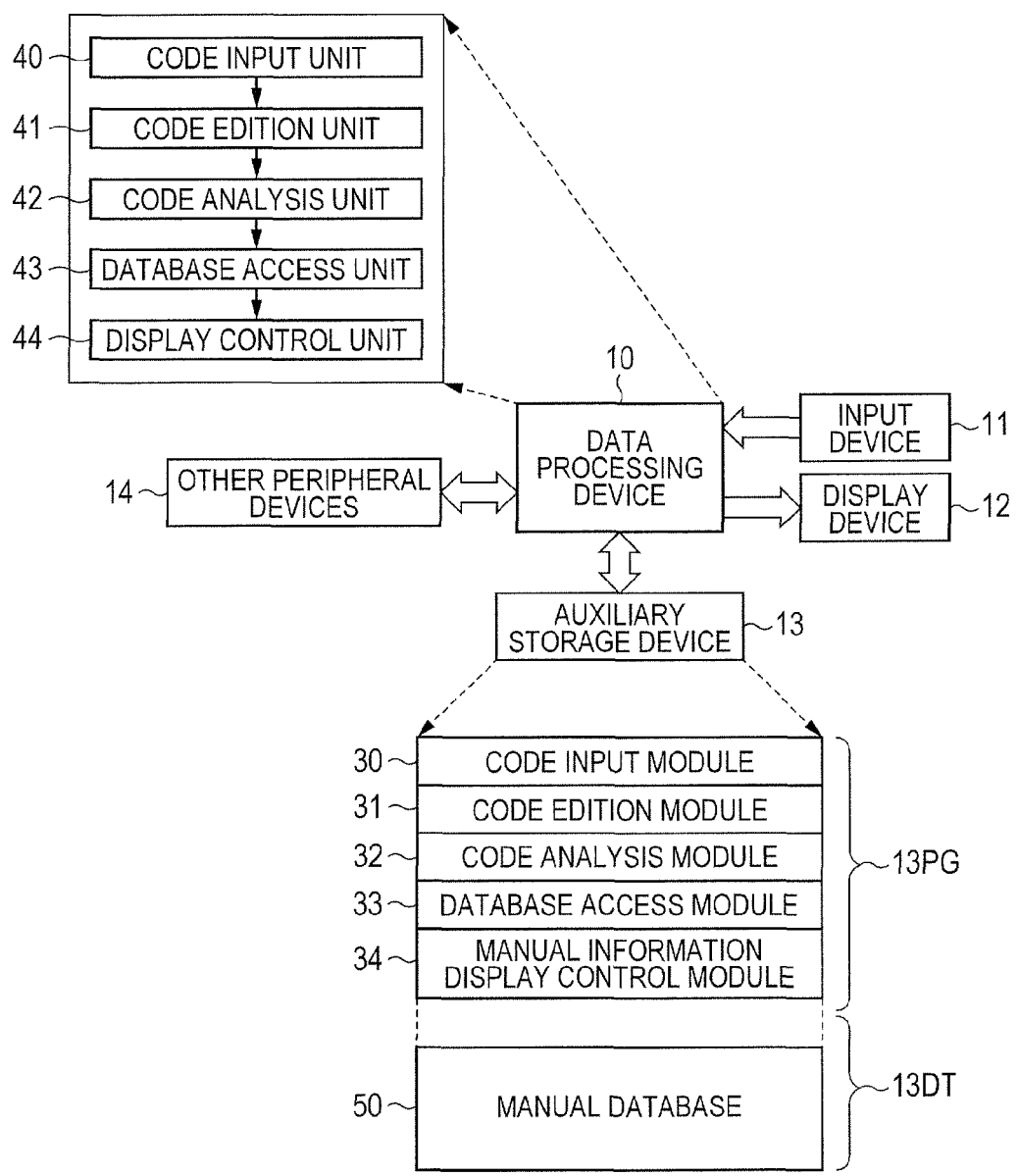
FIG. 1 is a block diagram illustrating a data processing system according to an embodiment.

First, an outline of an embodiment disclosed in the present application will be described. Reference symbols in the drawings, which are referred to with brackets in the description of the outline in the embodiment merely exemplify the concepts of components with the reference symbols.

[1]<<Search of Hierarchical Database Based on Character Strings Before and after a Member Access Operator, and the Number of Hierarchies>>

A data processing system (1) includes an input device (11), a data processing device (10) that conducts program processing, and a storage device (13) that stores a hierarchical database. The data processing device includes a code edition unit (41), a code analysis unit (42), and a database access unit (43). The code edition unit couples characters for describing a software program input from the input device together to create an input character string. If the input character string created by the code edition unit is a parameter of a program language, the code analysis unit divides the input character string for each of the number of hierarchies on the basis of the number of hierarchies sectioned by a member access operator indicative of an access to a member of a structure or a class to acquire hierarchical character strings and hierarchy numbers thereof. The database access unit searches a corresponding hierarchy of the hierarchical database with the hierarchical character string as a search key for each of the hierarchy numbers acquired by the code analysis unit, and acquires guide information corresponding to the hierarchical character string.

According to the above configuration, the guide information according to the hierarchy of a given character string can be sequentially acquired in response to an input of the characters for describing the software program, and only necessary guide information acquired depending on an input status of the character string can be displayed. As a result, even if the program scale increases, or even if the manual of the hardware to be developed in program is enormous, work for referring to the manual can be omitted, and the development efficiency of the software program can be improved. Further, since the guide information acquired for only a portion necessary for coding can be displayed, the readability of the manual and the comprehension of the user are improved, and an error in coding is reduced.

[2] <<Bit Operator as Direct Reference Operator>>

In the item 1, the member access operator is a dot operator as a direct reference operator in a C language.

According to the above configuration, a member referred to in the dot operator can be grasped as a hierarchical character string.

[3] <<Arrow Operator as Indirect Reference Operator>>

In the item 1, the member access operator is an arrow operator as an indirect reference operator in the C language.

According to the above configuration, a member referred to in the arrow operator can be grasped as a hierarchical character string.

[4] <<Display of Searched Record in Parallel to Display of Character Strings Corresponding to Hierarchy Names of the Number of Acquired Hierarchies>>

In the item 1, the data processing device further includes a display control unit (44) that displays an input character string input from the input device on the display device (12) under control, and the display control unit displays guide information searched and acquired from the hierarchical database by the database access unit on the display device in association with the hierarchical character string of the hierarchy number together with the input character string.

According to the above configuration, the guide information sequentially acquired according to the hierarchy of a given character string can be displayed depending on the input status of the character string in association with the character string.

[5] <<Real Time Display>>

In the item 4, the database access unit searches the hierarchical database on the basis of the hierarchical character string and the hierarchy number every time the code analysis unit acquires one hierarchical character string for the input character strings created by the code edition unit, and the display control unit displays guide information searched and acquired by the database access unit on the display device in association with the hierarchical character string of the hierarchy number together with the input character string.

According to the above configuration, the guide display corresponding to the hierarchical character string can be displayed in association with the hierarchical character string every time the hierarchical character string is grasped in the act of inputting the characters describing the software program. That is, the guide information corresponding to the hierarchical character string can be displayed at real time according to the progress of the character input for describing the software program.

[6]<<Specific Example of Determination Operation by Analysis Unit>>

In the item 1, the code analysis unit counts the number of member access operators included in the input character string created by the code edition unit, acquires the input character string as the hierarchical character string of a first hierarchy if the counted number of member access operators is 0, and sequentially acquires the character strings of the input character strings before and after the respective member access operators as the hierarchical character string of the first hierarchy to the hierarchical character string of an (n+1)th hierarchy if the counted number of member access operators is n (natural number).

According to the above configuration, the member access operators are recognized in order of inputting the input character string, as a result of which the hierarchies of the character strings sectioned by the member access operators can be easily grasped from the higher hierarchies, and the hierarchical character strings and hierarchy numbers thereof can be acquired.

[7] <<Specific Example of Determination Operation by Analysis Unit>>

In the item 6, the code analysis unit counts the number of member access operators included in the input character string created by the code edition unit, acquires the input character string as the hierarchical character string of a first hierarchy if the counted number of member access operators is 0 (S16), acquires the character string of the input character strings before the member access operator as the hierarchical character string of a first hierarchy, and the character string subsequent to the member access operator as the hierarchical character string of a second hierarchy if the counted number of member access operators is 1 (S17), and acquires the character string before a first member access operator as the hierarchical character string of a first hierarchy, the character string before a second member access operator as the hierarchical character string of a second hierarchy, and the character string subsequent to the second member access operator as the hierarchical character string of a third hierarchy if the counted number of member access operators is 2 (S18).

According to the above configuration, the member access operators are recognized in order of inputting the input character strings, as a result of which the three hierarchies of the character strings sectioned by the member access operators are easily grasped from the higher hierarchies, and the hierarchical character strings and hierarchy numbers thereof can be acquired.

[8] <<Hierarchical Database of Register Manual Information on Data Processing LSI>>

In the item 7, the hierarchical database includes a first hierarchy (50$a$, 50$b$, 50$c$, . . . ) having a module name as a search key, a second hierarchy (50$aa$, 50$ab$, 50$ba$, 50$bb$, 50$ca$, 50$cb$, . . . ) forming a lower hierarchy of the module name and having a register name as the search key, and a third hierarchy (50$aaa$, 50$aab$, 50$aac$, 50$baa$, 50$bab$, 50$bac$, 50$caa$, 50$cab$, 50$cac$, . . . ) forming a lower hierarchy of the register name and having a bit name as the search key, and has information on the register manual of the data processing LSI as the guide information.

According to the above configuration, when bits of the register are set as the parameter in the program description of the software, the hardware manual is easily referred to.

[9] <<Hierarchical Database of Manual Information on Library Function>>

In the item 7, the hierarchical database includes a first hierarchy having a class name of module operation as a search key, a second hierarchy forming a lower hierarchy of the class name of the module operation and having a class name of the register operation as the search key, and a third hierarchy forming a lower hierarchy of the class name of the register operation and having a bit operation function name as the search key, and has information on the manual of the library function for the register operation as the guide information.

According to the above configuration, the software manual of the library function is easily referred to in the program description of the software.

[10]<<Search of Hierarchical Database Based on Character Strings Before and after Member Access Operator, and the Number of Hierarchies>>

An input support method in which a data processing device that conducts program processing inputs characters for describing a software program from an input device, and acquires and displays guide information from a hierarchical database includes a data edition process (S2), a code analysis process (S3, S4), a database access process (S5), and a display control process (S6). The code edition process couples the characters input from the input device together to create an input character string. If the input character string created by the code edition process is a parameter of a program language, the code analysis process divides the input character string for each of the number of hierarchies on the basis of the number of hierarchies sectioned by a member access operator indicative of an access to a member of a structure or a class to acquire hierarchical character strings and hierarchy numbers thereof. The database access process searches a corresponding hierarchy of the hierarchical database with the hierarchical character string as a search key for each of the hierarchy numbers acquired by the code analysis process, and acquires guide information corresponding to the hierarchical character string. The display control process displays the guide information acquired from the hierarchical database by the database access process on the display device in association with the hierarchical character string of the hierarchy number together with the input character string.

According to the above configuration, the guide information according to the hierarchy of a given character string can be sequentially acquired in response to an input of the characters for describing the software program, and the guide information sequentially acquired according to the hierarchy of a given character string can be displayed in association with the character string depending on the input status of the character string. As a result, even if the program scale increases, or even if the manual of the hardware to be developed in program is enormous, work for referring to the manual can be omitted, and the development efficiency of the software program can be improved. Further, since the guide information acquired for only a portion necessary for coding can be displayed, the readability of the manual and the comprehension of the user are improved, and an error in coding is reduced.

[11]<<Dot Operator as Direct Reference Operator>>

In the item 10, the member access operator is a dot operator as a direct reference operator in a C language.

According to the above configuration, a member referred to in the dot operator can be grasped as a hierarchical character string.

[12]<<Dot Operator as Direct Reference Operator>>

In the item 10, the member access operator is an arrow operator as an indirect reference operator in the C language.

According to the above configuration, a member referred to in the arrow operator can be grasped as a hierarchical character string.

[13] <<Real Time Display>

In the item 10, the database accessing step searches the hierarchical database on the basis of the hierarchical character string and the hierarchy number every time one hierarchical character string is acquired from the input character strings created by the code editing step in the code analyzing step. The display control step displays guide information searched and acquired by the database accessing step on the display device in association with the hierarchical character string of the hierarchy number together with the input character string every time the guide information is acquired.

According to the above configuration, the guide display corresponding to the hierarchical character string can be displayed in association with the hierarchical character string every time the hierarchical character string is grasped in the act of inputting the characters describing the software program. That is, the guide information corresponding to the hierarchical character string can be displayed at real time according to the progress of the character input for describing the software program.

[14] <<Specific Example of Determination Operation by Analysis Unit>>

In the item 10, the code analyzing step counts the number of member access operators included in the input character string created by the code editing step, acquires the input character string as the hierarchical character string of a first hierarchy if the counted number of member access operators is 0, and sequentially acquires the character strings of the input character strings before and after the respective member access operators as the hierarchical character string of the first hierarchy to the hierarchical character string of an (n+1)th hierarchy if the counted number of member access operators is n (natural number).

According to the above configuration, the member access operators are recognized in order of inputting the input character strings, as a result of which the three hierarchies of the character strings sectioned by the member access operators are easily grasped from the higher hierarchies, and the hierarchical character strings and hierarchy numbers thereof can be acquired.

[15] <<Specific Example of Determination Operation by Analysis Unit>>

In the item 14, the code analyzing step counts the number of member access operators included in the input character string created by the code editing step, acquires the input character string as the hierarchical character string of a first hierarchy if the counted number of member access operators is 0 (S16), acquires the character string of the input character strings before the member access operator as the hierarchical character string of a first hierarchy, and the character string subsequent to the member access operator as the hierarchical character string of a second hierarchy if the counted number of member access operators is 1 (S17), and acquires the character string before a first member access operator as the hierarchical character string of a first hierarchy, the character string before a second member access operator as the hierarchical character string of a second hierarchy, and the character string subsequent to the second member access operator as the hierarchical character string of a third hierarchy if the counted number of member access operators is 2 (S18).

According to the above configuration, the member access operators are recognized in order of inputting the input character strings, as a result of which the three hierarchies of the character strings sectioned by the member access operators are easily grasped from the higher hierarchies, and the hierarchical character strings and hierarchy numbers thereof can be acquired.

[16] <<Hierarchical Database of Register Manual Information on Data Processing LSI>>

In the item 15, the hierarchical database includes a first hierarchy having a module name as a search key, a second hierarchy forming a lower hierarchy of the module name and having a register name as the search key, and a third hierarchy forming a lower hierarchy of the register name and having a bit name as the search key, and has information on the register manual of the data processing LSI as the guide information.

According to the above configuration, when bits of the register are set as the parameter in the program description of the software, the hardware manual is easily referred to.

[17] <<Hierarchical Database of Manual Information on Library Function>>

In the item 15, the hierarchical database includes a first hierarchy having a class name of module operation as a search key, a second hierarchy forming a lower hierarchy of the class name of the module operation and having a class name of the register operation as the search key, and a third hierarchy forming a lower hierarchy of the class name of the register operation and having a bit operation function name as the search key, and has information on the manual of the library function for the register operation as the guide information.

According to the above configuration, the software manual of the library function is easily referred to in the program description of the software.

[18]<<Search of Hierarchical Database Based on Character Strings Before and after Member Access Operators and the Number of Hierarchies>>

An input support program (30 to 34) for causing a computer device to execute a process of inputting characters for describing a software program from an input device, and guide information is acquired from a hierarchical database, and displayed, controls a code edition process (S2), a code analysis process (S3, S4), a database access process (S5), and a display control process (S6). The code edition process couples the characters input from the input device together to create an input character string. If the input character string created by the code edition process is a parameter of a program language, the code analysis process divides the input character string for each of the number of hierarchies on the basis of the number of hierarchies sectioned by a member access operator indicative of an access to a member of a structure or a class to acquire hierarchical character strings and hierarchy numbers thereof. The database access process searches a corresponding hierarchy of the hierarchical database with the hierarchical character string as a search key for each of the hierarchy numbers acquired by the code analysis process, and acquires guide information corresponding to the hierarchical character string. The display control process displays the guide information acquired from the hierarchical database by the database access process on the display device in association with the hierarchical character string of the hierarchy number together with the input character string.

According to the above configuration, the input support method can be easily realized in which the guide information according to the hierarchy of a given character string can be sequentially acquired in response to an input of the characters for describing the software program, and the guide information sequentially acquired according to the hierarchy of a given character string can be displayed in association with the character string depending on the input status of the character string. Further, the input support method can be easily realized in which even if the program scale increases, or even if the manual of the hardware to be developed in program is enormous, work for referring to the manual can be omitted, and the development efficiency of the software program can be improved. Further, the input support method can be easily realized in which since the guide information acquired for only a portion necessary for coding can be displayed, the readability of the manual and the comprehension of the user are improved, and an error in coding is reduced.

[19] <<Dot Operator as Direct Reference Operator>>

In the item 18, the member access operator is a dot operator as a direct reference operator in a C language.

According to the above configuration, a member referred to in the dot operator can be grasped as a hierarchical character string.

[20] <<Arrow Operator as Indirect Reference Operator>>

The member access operator is an arrow operator as an indirect reference operator in the C language.

According to the above configuration, a member referred to in the arrow operator can be grasped as a hierarchical character string.

[21] <<Real Time Display>>

In the item 18, the database accessing step searches the hierarchical database on the basis of the hierarchical character string and the hierarchy number every time one hierarchical character string is acquired from the input character strings created by the code editing step in the code analyzing step. The display control step displays guide information searched and acquired by the database accessing step on the display device in association with the hierarchical character string of the hierarchy number together with the input character string every time the guide information is acquired.

According to the above configuration, the input support method can be easily realized in which the guide display corresponding to the hierarchical character string can be displayed in association with the hierarchical character string every time the hierarchical character string is grasped in the act of inputting the characters describing the software program. That is, the input support method can be easily realized in which the guide information corresponding to the hierarchical character string is displayed at real time according to the progress of the character input for describing the software program.

[22] <<Specific Example of Determination Operation by Analysis Unit>>

In the item 18, the code analyzing step counts the number of member access operators included in the input character string created by the code editing step, acquires the input character string as the hierarchical character string of a first hierarchy if the counted number of member access operators is 0, and sequentially acquires the character strings of the input character strings before and after the respective member access operators as the hierarchical character string of the first hierarchy to the hierarchical character string of an (n+1)th hierarchy if the counted number of member access operators is n (natural number).

According to the above configuration, the input support method can be easily realized in which the member access operators are recognized in order of inputting the input character strings, as a result of which the hierarchies of the character strings sectioned by the member access operators are easily grasped from the higher hierarchies, and the hierarchical character strings and hierarchy numbers thereof are acquired.

2. Details of Embodiments

Embodiments will be further described in detail.

FIG. 1 illustrates a data processing system according to an embodiment. A data processing system 1 shown in the figure is not particularly restricted, but is realized by a computer device such as a personal computer or an engineering workstation. In FIG. 1, a computer device includes a data processing device 10 as a computer main body, an input device 11, a display device 12, an auxiliary storage device 13, and other peripheral devices 14.

The data processing device 10 is configured by mounting semiconductor integrated circuit devices such as a processor, a main memory, an accelerator, a storage controller, a display controller, an external input interface controller, and a communication controller, and a power supply circuit on a mother board.

The input device 11 is a known device that can enter character codes such as a keyboard or a capacitance touch panel, and can enter characters for describing a software program, by, for example, a C language.

The display device 12 is a device using liquid crystal or electroluminescence that displays a moving image or a still image by scanning driving and lighting driving of a display screen per display frame.

The auxiliary storage device 13 is a hard disk, an optical disk, or a nonvolatile memory disk using a nonvolatile semiconductor memory. The auxiliary storage device 13 includes a storage area 13PG of a program as software executed by the data processing device 10, and a storage area 13DT of data.

The other peripheral devices 14 represent a wired or wireless network terminal, or a printer that forms an image, and displays the image on a medium such as hardware. When a new program or data is stored in the auxiliary storage device 13, the program or data may be received by the network terminal via a communication line, and the data processing device 10 may store the received program or data in the auxiliary storage device 13.

The data processing system 1 of FIG. 1 realizes a program processing function according to the program to be executed by the data processing device 10. In this example, it is assumed to realize an integrated development environment for program development, for example, exemplified in FIG. 2. An integrated development environment 20 realizes functions of a program input device 21, a complier 22, and a debugger 23. A debug window group 24 such as register display or memory display is displayed on the display device 12. Emulator hardware 25 is connected as the other peripheral devices 14, and the emulator hardware 25 is connected with an evaluation board 26 as an actual equipment to be emulated.

The program input device 21 realizes an input support function for supporting an input of the program from the input device 11 by a user.

The complier 22 realizes a function of inputting and compiling a source code, and outputting an object module.

The debugger 23 realizes the following functions. That is, the debugger 23 receives the object module from the complier 22, and delivers the program code to the emulator hardware 25 on the basis of this object module. The evaluation board 26 is a board having a peripheral function necessary to evaluate the microcomputer and the user, and the emulator hardware 25 controls the microcomputer on the evaluation board 26 according to a control instruction from the debugger 23. Also, the debugger 23 delivers debug information (correspondence between source lines and addresses) included in the object module to the program input device 21. Also, the debugger 23 acquires an execution result (values in the memory or the register) of the program code obtained from the microcomputer on the evaluation board 26, or data of a resource within the microcomputer, and displays the acquired execution result or data on the debug window group 24.

Figure 2:
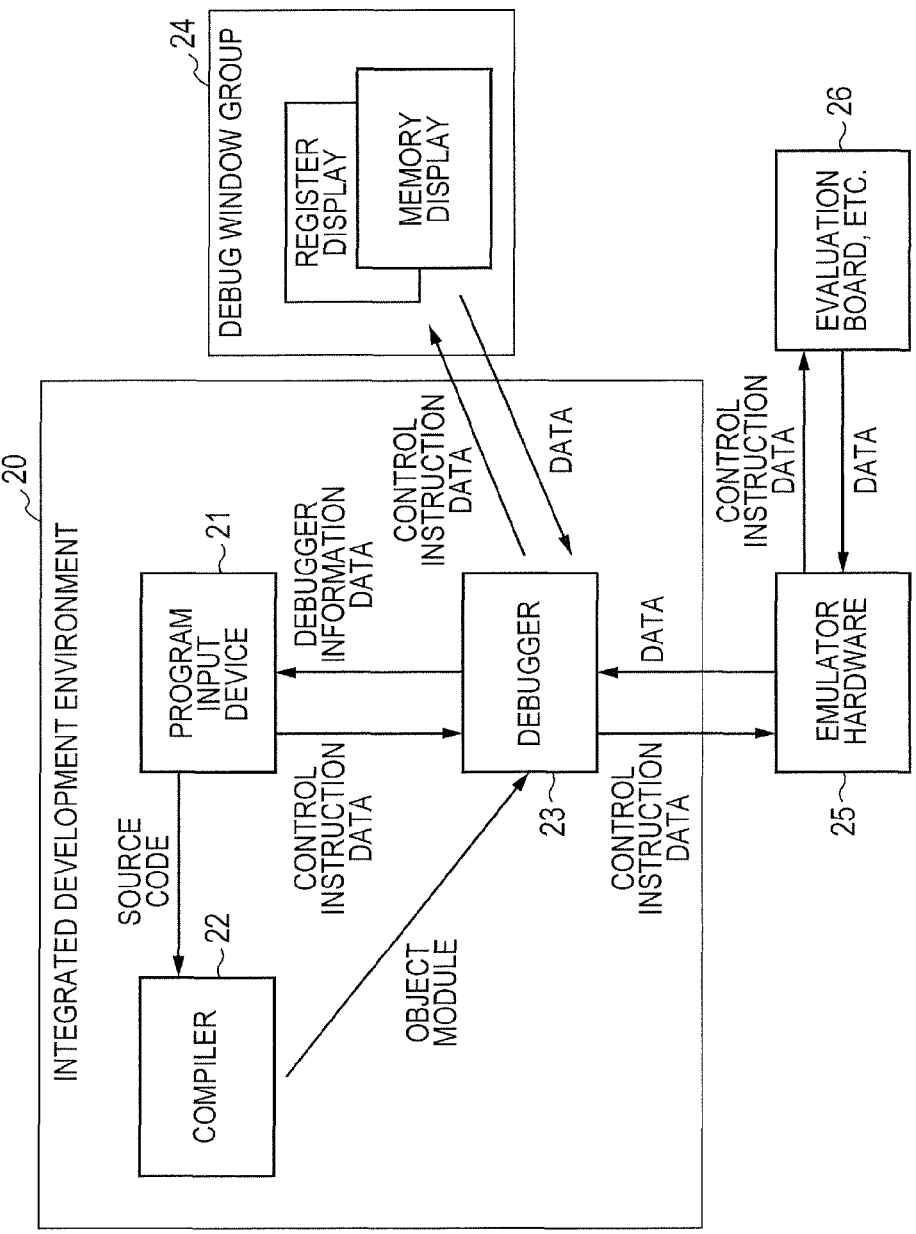
FIG. 2 is an illustrative view illustrating an example of an integrated development environment to which the data processing system of FIG. 1 is applied.

FIG. 1 exemplifies the details when realizing the program input device 21 under the integrated development environment of FIG. 2. The program input device 21 adds an input support function of the program to a function of a text editor, and in this example, an input support function of the program is a characteristic function. The input support function of the program described in this example is an example of a function (a hierarchical guide display function of the register manual information) of displaying, in response to a program input, guide information on a control register and its control bits in a data processing LSI having the program processing function and the peripheral functions within one chip, which is called the microcomputer or a system on-chip. In response to this function, a manual database 50 that hierarchically retains manual information on a function, a use method, and notes of the above control register is configured in the data area 13DT.

Figure 3:
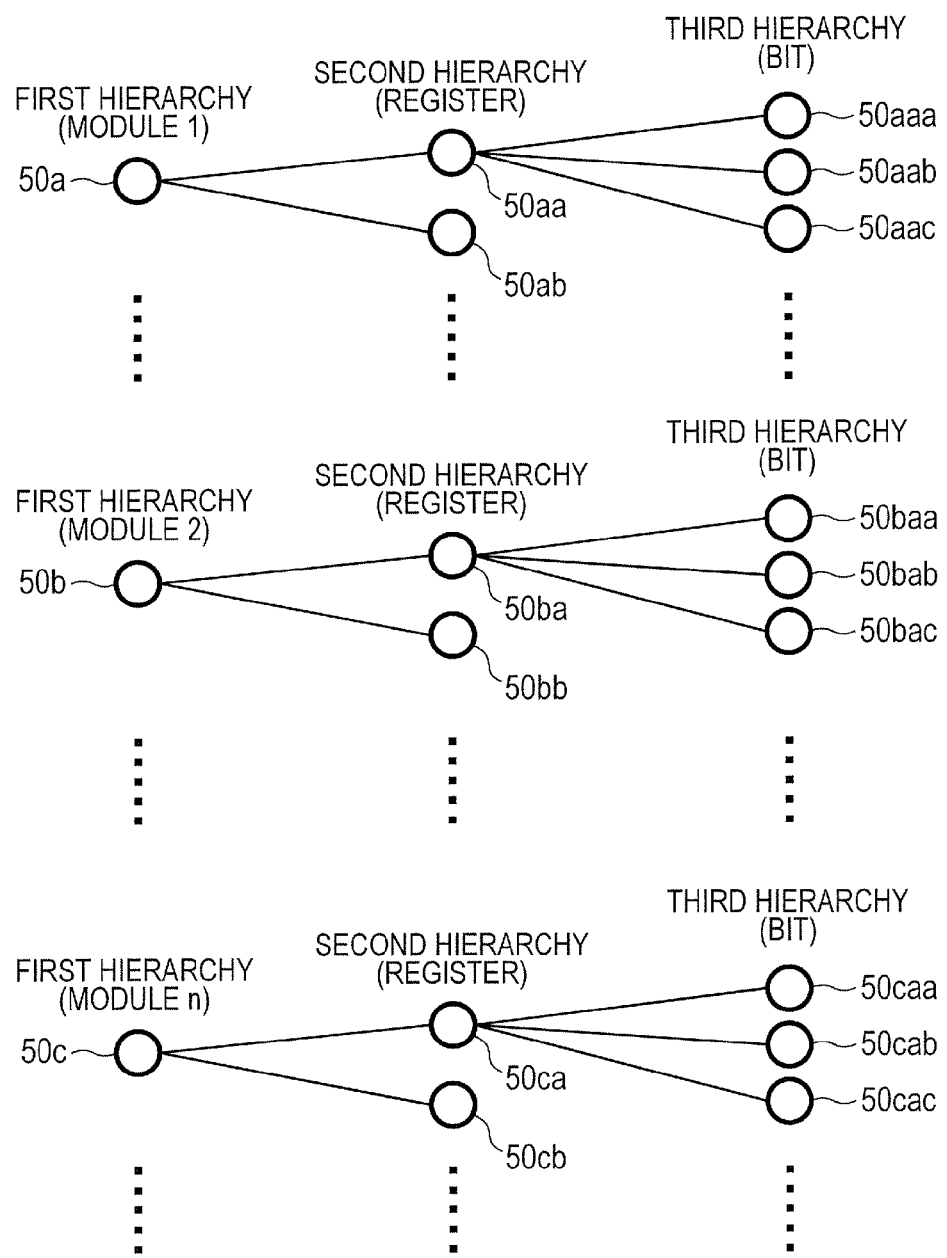
FIG. 3 is an illustrative view exemplifying a hierarchical structure of a manual database.

The manual database 50 is not particularly restricted, but, as illustrated in FIG. 3, includes a first hierarchy 50*a*, 50*b*, 50*c*, ... having a module name of a circuit module in which the control register is arranged as a search key, a second hierarchy 50*aa*, 50*ab*, 50*ba*, 50*bb*, 50*ca*, 50*cb*, ... forming a lower hierarchy of the module name and having a register name as the search key, and a third hierarchy 50*aaa*, 50*aab*, 50*aac*, 50*baa*, 50*bab*, 50*bac*, 50*caa*, 50*cab*, 50*cac*, ... forming a lower hierarchy of the register name and having a bit name as the search key. The hierarchical databases in which information corresponding to the search keys is retained as the record are configured in the respective hierarchies.

The auxiliary storage device 13 includes a code input module 30, a code edition module 31, a code analysis module 32, a database access module 33, and a display control module 34, as an input support program to be executed by the data processing device 10.

The data processing device 10 executes the code input module 30 to realize a code input unit 40 as the program processing function. Likewise, the data processing device 10 executes the code edition module 31 to realize a code edition unit 41 as the program processing function, executes the code analysis module 32 to realize a code analysis unit 42 as the program processing function. Also, the data processing device executes the database access module 33 to realize a database access unit 43 as the program processing function, and executes the display control module 34 to realize a display control unit 44 as the program processing function.

The code input unit 40 inputs a source code from the input device 11 as a character code per character, and delivers the source code to the code edition unit 41.

The code edition unit 41 receives the character code for describing the software program input from the code input unit 40, creates a character string (hereinafter referred to as "input character string") of the character code together with the character code received previously every time the character code is received, and outputs the created input character string to the code analysis unit. The character string in this example is not particularly restricted, but represents a description for designating the parameters of the program language, and a string of character code group describing the parameters.

The code analysis unit 42 divides the input character string created by the code edition unit 41 for each of the number of hierarchies on the basis of the number of hierarchies sectioned by a member access operator indicative of an access to a member of a structure or a class to acquire hierarchical character strings and hierarchy numbers thereof. In this example, it is assumed that the description for setting the parameters that designate the control bits of the control register is a description of the structure having the module name, the register name, and the bit name as the members. Therefore, it is assumed that the member access operator is a dot operator as the direct reference operator in the C language. For example, if the input character string is the parameter description of the register as the structure, the module name, the register name, and the respective hierarchy numbers are acquired from the input character string.

The database access unit 43 searches a corresponding hierarchy of the manual database 50 with the hierarchical character string as a search key for each of the hierarchy numbers acquired by the code analysis unit 42, and acquires guide information corresponding to the hierarchical character string.

The display control unit 44 displays guide information acquired from the manual database 50 by the database access unit 43 on the display device 12 in association with the hierarchical character string of the hierarchy number corresponding to the guide information together with the input character string.

Figure 4:
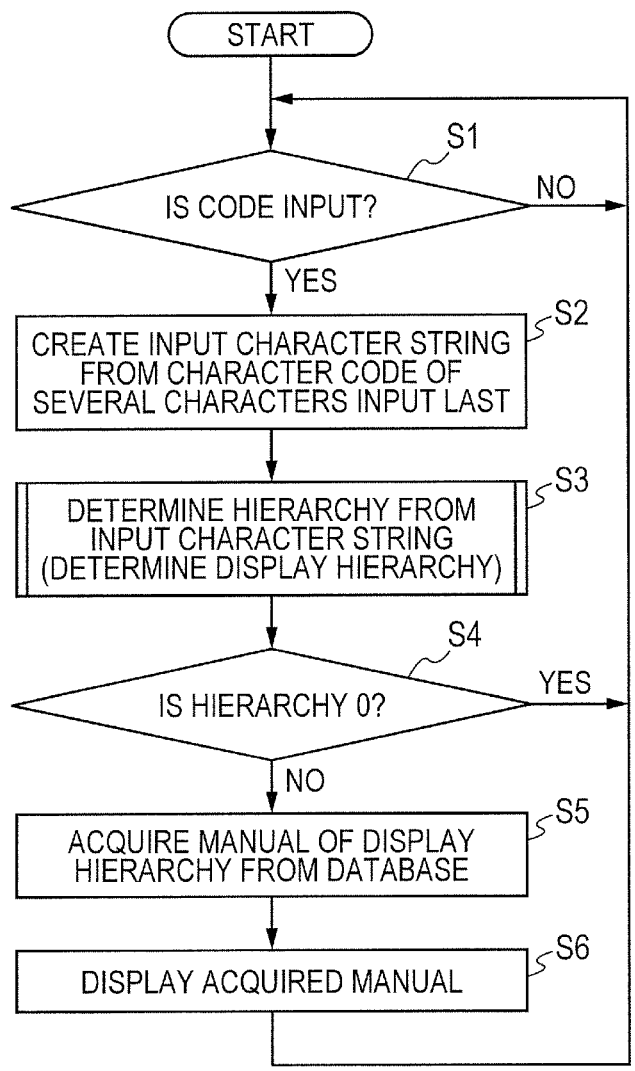
FIG. 4 is a flowchart entirely exemplifying the operation of supporting a program input by a program input device.

FIG. 4 illustrates the overall support operation of the program input by the program input device 21.

When the user inputs the source code with the use of the program input device 21, the code input unit 40 monitors the input of the source code from the user per character, and outputs the source code as character code to the code edition unit 41 if the source code is input (S1).

The code edition unit 41 couples the character codes for S previously input from the code input unit 40 together so as to enter all of variable names to create the input character string (S2). To enter all of the variable names means that the parameter inputs are not omitted at all.

Then, if the input character string created by the code edition unit 41 is a parameter of the program language, the code analysis unit 42 divides the input character string for each of the number of hierarchies on the basis of the number of hierarchies of the input character string sectioned by a delimiting character to acquire the hierarchical character string and its hierarchy number (S3). If the input character string is not the parameter of the program language, the code analysis unit 42 sets the hierarchy of the input character string to 0.

Then, the database access unit 43 determines whether the hierarchy determined in Step S3 is 0 (means not whether the hierarchy number is 0, or not, that is, not whether the number of delimiting characters is 0, or not, but that the input character string is not the parameter setting of the register), or not (S4). If the hierarchy is 0, since the input character string is not the parameter of the control register, the database access unit 43 discards the input character string, and returns to Step S1. If the hierarchy is not 0, the database access unit 43 proceeds to subsequent Step S5.

In Step S5, the database access unit 43 searches and acquires the manual information to be displayed for the user from the manual information retained within the manual database 50 on the basis of the hierarchical character string and its hierarchy number acquired in Step S3 (S6).

That is, regarding a hierarchy number 1 (first hierarchy), the database access unit 43 searches the module name with a hierarchical character string corresponding to the hierarchy number 1 as a search key from the first hierarchy 50a, 50b, 50c, . . . of the manual information retained within the manual database 50, and acquires the manual information to be displayed for the user from the first hierarchy.

Regarding the subsequent hierarchy number 2 (second hierarchy), the database access unit 43 searches the register name with a hierarchical character string corresponding to the hierarchy number 2 as the search key from the second hierarchy that is a child of the searched first hierarchy, and acquires the manual information to be displayed for the user from the second hierarchy.

Regarding the subsequent hierarchy number 3 (third hierarchy), the database access unit 43 searches the bit name with a hierarchical character string corresponding to the hierarchy number 3 as the search key from the third hierarchy that is a child of the searched second hierarchy, and acquires the manual information to be displayed for the user from the third hierarchy.

Figure 5:
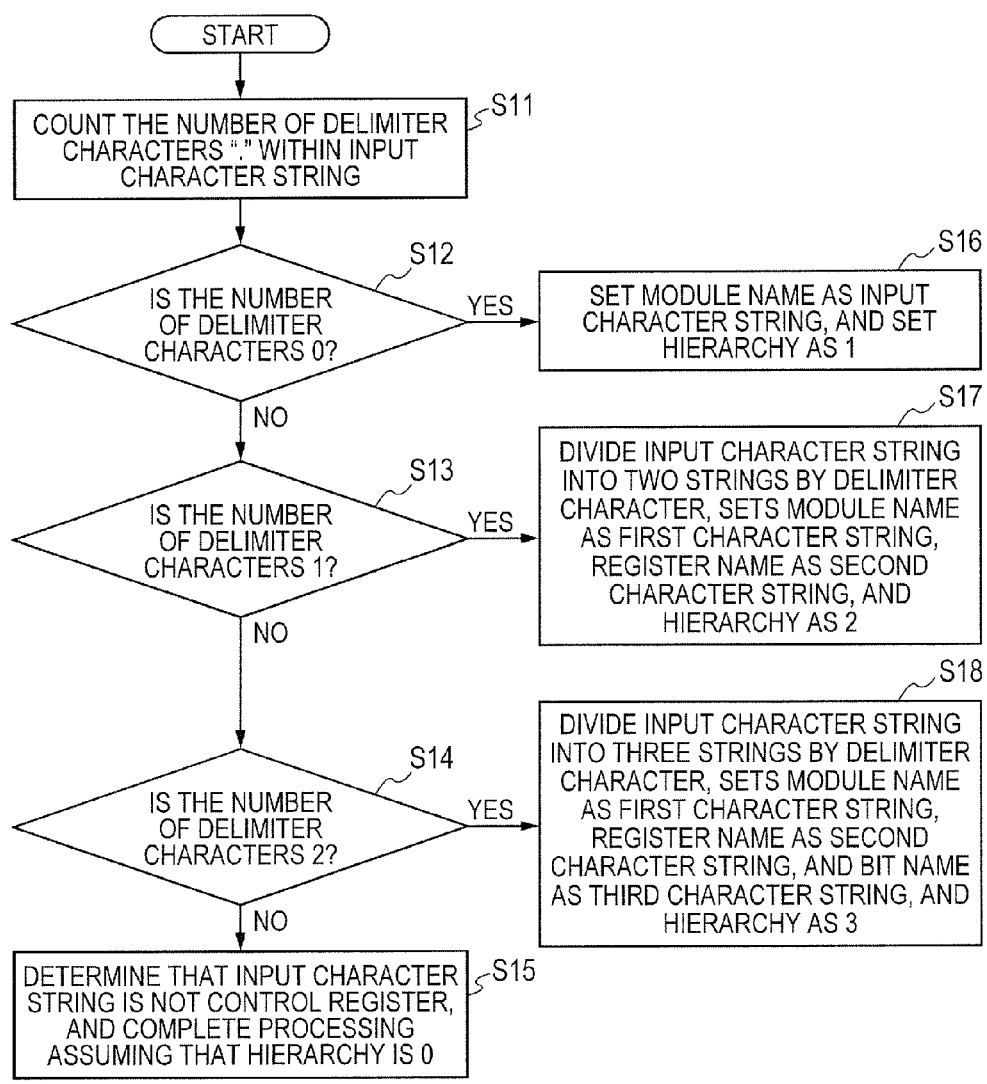
FIG. 5 is a flowchart of detailed processing in Step S3 by a code analysis unit.

FIG. 5 illustrates the details of processing in Step S3 by the code analysis unit 42.

The code analysis unit 42 counts the number of delimiting characters (dot operators) "•" within the input character string (S11). The delimiting character "•" is an example when the source code is described in the C language. A character other than "•" may be set as the delimiting character in conformity to the program language, or two or more characters may be set as the delimiting character.

Subsequently, the code analysis unit 42 determines whether the number of delimiting characters is 0, or not (S12). If the number of delimiting characters is 0 in Step S12, the code analysis unit 42 proceeds to Step S16. The code analysis unit 42 completes the processing with the input character string at that time as the hierarchical character string of the hierarchy 1 (hierarchy number 1) (S16). The parameter description in this case is a description for merely designating the module name, or a description in a state where the character string input is advanced to the module name designation.

If the number of delimiting characters is not 0 in Step S12, the code analysis unit 42 proceeds to subsequent Step S13, and the code analysis unit 42 determines whether the number of delimiting characters is 1, or not (S13). If the number of delimiting characters is 1 in Step S13, the code analysis unit 42 proceeds to Step S17. The code analysis unit 42 separates the input character string into two character strings before and after the delimiting character, and completes the processing with a front character string as the hierarchical character string of the hierarchy 1 (hierarchy number 1), and a back character string as the hierarchical character string of the hierarchy 2 (hierarchy number 2) (S17). The parameter description in this case is a description for designating the module name and the register name, or a description in a state where the character string input is advanced to the module name designation or the register name designation.

If the number of delimiting characters is not 1 in Step S13, the code analysis unit 42 proceeds to subsequent Step S14, and the code analysis unit 42 determines whether the number of delimiting characters is 2, or not (S14). If the number of delimiting characters is 2 in Step S14, the code analysis unit 42 proceeds to Step S18. The code analysis unit 42 separates the input character string into three character strings before, between, and after the delimiting characters, and completes the processing with a front character string as the hierarchical character string of the hierarchy 1 (hierarchy number 1), a middle character string as the hierarchical character string of the hierarchy 2 (hierarchy number 2), and a back character string as the hierarchical character string of the hierarchy 3 (hierarchy number 3) (S18). The parameter description in this case is a description for designating the module name, the register name, and the bit name.

If the number of delimiting characters is not 2 in Step S14, the code analysis unit 42 proceeds to subsequent Step S15, and the code analysis unit 42 determines that the input character string is not the parameter designation of the control register. Then, code analysis unit 42 completes this processing with the hierarchy as 0 (S15).

Figure 6:
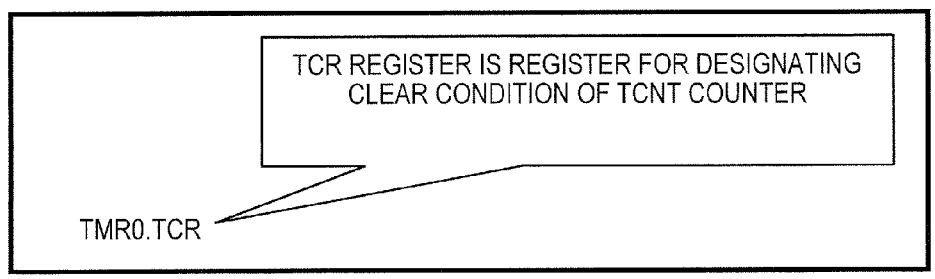
FIG. 6 is an illustrative view illustrating a guide display example during parameter inputting by the program input device.
Figure 7:
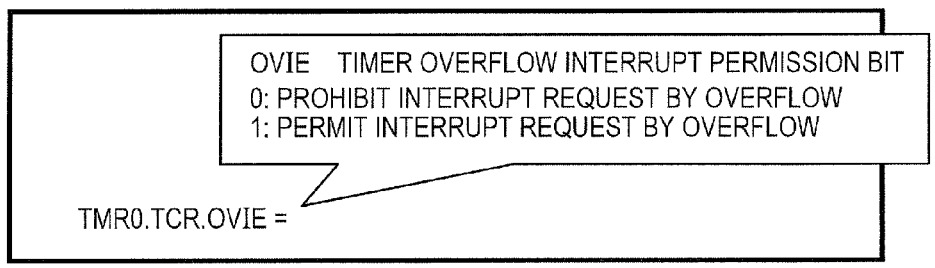
FIG. 7 is an illustrative view illustrating a guide display example when the parameter input by the program input device proceeds to the end.

FIGS. 6 and 7 illustrate display examples of the guide display by the program input device 21.

FIG. 6 is a display example in the middle of inputting the source code (TMR0.TCR.OVIE=1;) with the use of a variable "TMR0.TCR.OVIE" for allowing the user to access to the control register. FIG. 6 illustrates a state in which the character codes of "T", "M", "R", "0", "•", "T", "C", and "R" are input in order from a head.

The source code input to the input device 11 by the user creates "TMR0.TCR" from the code input unit 40 in the code edition module 31 as the character string, and is delivered to the code analysis unit 42 (S1, S2). In the code analysis unit 42, as a result of counting the delimiting characters "•" within the input character string (S11), the number of delimiting characters becomes 1. Therefore, the input character string is divided into two character strings of "TMR0" and "TCR" before and after the delimiting character. "TMR0" which is a first divided character string is set as the hierarchical character string (module name) of the hierarchy number 1, "TCR" which is a second divided character string is set as the hierarchical character string (register name) of the hierarchy number 2, and the number (hierarchy number) of hierarchies is set as 2 (S17).

Then, in the database access unit 43, since the hierarchy is not 0, the flow proceeds to Step S5. The manual information to be displayed for the user is searched and acquired from the manual information retained within the manual database 50. Since the number of hierarchies is 2, a manual "The RCR register is a register for designating a clear condition of the TCNT counter." in which the module name of the first hierarchy is "TMR0", and the register name of the second hierarchy is "TCR" is first acquired from the manual information retained within the manual database 50 from the second hierarchy (S5), and displayed for the user by a hop-up display in the display control unit 44 (S6).

FIG. 7 illustrates a display example in a state where the input is further advanced to "TMR0.TCR.OVIE=" as compared with FIG. 6. In FIG. 7, because the input character string is "TMR0.TCR.OVIE", the number of delimiting characters becomes 2, the hierarchical character string (module name) of the hierarchy number 1 is set as "TMR0", the hierarchical character string (register name) of the hierarchy number 2 is set as "TCR", the hierarchical character string (bit name) of the hierarchy number 3 is set as "OVIE", and the number of hierarchies becomes 3. In this situation, the contents of the manual displayed for the user by the pop-up display is switched to "OVIE timer overflow interrupt permission bit 0: interrupt request by overflow is prohibited 1: interrupt request by the overflow is permitted" of the third hierarchy.

The above embodiment obtains the following advantages.

(1) According to the program input device 21 realized by the above data processing system 1, and also the above input support method conducted by the program input device 21, the manual information such as the function, the use method, and the notes of the control register is hierarchized and retained in the manual database 50, and it is discriminated whether the input source code is the parameter designation of the control register, or not, on the basis of the hierarchy of the description, in the code analysis unit 42. In the manual database 50, information on the manual such as the function, the use method, and the notes of the control register is divided retained into the first hierarchy 50a, 50b, 50c, . . . that retains the manual of the module level, second hierarchy 50aa, 50ab, 50ba, 50bb, 50ca, 50cb . . . that retains the manual of the register level, and the third hierarchy 50aaa, 50aab, 50aac, 50baa, 50bab, 50bac, 50caa, 50cab, 50cac, . . . that retains the manual of the bit level. Only the information of the necessary hierarchy can be provided by the database access unit 43 on the basis of the hierarchical character string and the hierarchy number obtained by the code analysis in the code analysis unit 42. The guide information according to the hierarchy of a given character string can therefore be sequentially acquired in response to an input of the characters for describing the software program, and only the guide information acquired depending on the input status of the character string can be displayed. Therefore, even if the amount of information to be displayed for the user is not reduced to increase the guide display area, information required by the user can be displayed.

(2) With the above configuration, even if the program scale increases, or even if the manual of the hardware to be developed in program is enormous, work for referring to the manual can be omitted, and the development efficiency of the software program can be improved.

(3) According to the above data processing system 1 and the above input support method, in the code analysis unit 42, if the input character string of the user is a variable, with the checking of the number of delimiting characters appearing in the variable, the hierarchy required by the user in the act of inputting can be easily determined. That is, the delimiting characters are recognized in order of inputting the input character strings, as a result of which the hierarchies of the character strings sectioned by the delimiting characters can be easily grasped from the higher hierarchy, and the hierarchical character string and its hierarchy number can be acquired.

(4) According to the above data processing system 1 and the above input support method, the guide display corresponding to the hierarchical character string can be displayed in association with the hierarchical character string every time the hierarchical character string is grasped in the act of inputting the characters describing the software program. That is, the guide information corresponding to the hierarchical character string can be displayed at real time according to the progress of the character input for describing the software program.

(5) According to the above data processing system 1 and the above input support method, since the guide information acquired for only a portion necessary for coding can be displayed, the readability of the manual and the comprehension of the user are improved, and an error in coding is reduced.

(6) According to the input support program including the code input module 30, the code edition module 31, the code analysis module 32, the database access module 33, and the display control module 34, the program is installed and executed on the computer device such as a personal computer or an engineering workstation, as a result of which the program input device 21 as the data processing system can be easily realized, and the input support method can be easy conducted.

The present invention is not limited to the above embodiment, but can be variously changed without departing from the spirit of the present invention.

For example, the display device 12 may be a printer that forms an image and displays the image on a medium such as a hard copy.

Also, the member access operator is not limited to the dot operator as the direct reference operator in the C language. The member access operator may be an arrow operator as the indirect reference operator in the C language.

The order of hierarchies of the parameters, and also a hierarchical structure of the hierarchical database corresponding to the hierarchy of the parameters may be an order other than a module register bits. For example, in the case of a control register having no individual bits, two hierarchies of the module and the register may be applied. If only one control register is included in the module, bits may be arranged immediately below the module. Also, when the bits are arranged immediately below the register like the two hierarchies of the modules and the bits, two hierarchies of the registers and the bits are configured. Further, when there are two or more peripheral modules having the same function, a parent module integrating those peripheral modules together may be assumed. In this case, four hierarchies of the parent module, the modules, the bits, and the registers are provided. For example, four hierarchies of a timer, timers 2, the timer control registers, and the interrupt permission bits are provided. In any one of the above hierarchical structures, or in the mixture of those hierarchical structures, the control technique is identical with that in the above embodiment. The member access operators may be detected from a higher side of the description to sequentially acquire the hierarchical character strings and the hierarchy numbers, and the hierarchical database may be searched on the basis of the acquired hierarchical character strings and the hierarchy numbers to apply the manual information hit under search.

The parameter description may be a hierarchical description other than the register. If an object oriented language such as C++ is exemplary a case in which the library function and its manual are provided is conceivable. For example, let us consider a case in which the library function that operates the control register and its manual are provided to the user. A class that operates the register is disposed within a class that operates the module, and a function that operates the bits is disposed within the class that operates the register. In order to operate the bits, the description can be conducted as follows. That is, "module operation class acquisition ( )→ register operation class acquisition ( )→ bit setting ( )". More specifically, a flag can be set with a call such as "GetTMR0( )→GetTCR( )→SetOVIE(1);". In this case, search is conducted with ( )→ as the delimiting characters, and the function name such as GetTMR0 as the search word, and analysis is conducted likewise so that the description of the library function of the function can be displayed. In the above example, the access by →(arrow) operator is described. Alternatively, implementation by a • (dot) operator can be conducted.

The member access operator is not limited to the (dot) operator, or the →(arrow) operator, and another operator may be applied if the operator is indicative of an access to the member of the structure or the class.

What is claimed is:

1. A data processing system comprising:
an input device;
a data processing device that conducts program processing;
and a storage device that stores a hierarchical database, wherein the data processing device includes a code edition unit, a code analysis unit, and a database access unit, wherein the code edition unit couples characters for describing a software program input from the input device together to create an input character string, wherein if the input character string created by the code edition unit is a parameter of a program language, the code analysis unit divides the input character string for each of the number of hierarchies on the basis of the number of hierarchies sectioned by a member access operator indicative of an access to a member of a structure or a class to acquire hierarchical character strings and hierarchy numbers thereof,
wherein the database access unit searches a corresponding hierarchy of the hierarchical database with the hierarchical character string as a search key for each of the hierarchy numbers acquired by the code analysis unit, and acquires guide information corresponding to the hierarchical character string, and wherein the code analysis unit counts the number of member access operators included in the input character string created by the code edition unit, acquires the input character string as the hierarchical character string of a first hierarchy if the counted number of member access operators is zero, and sequentially acquires the character strings of the input character strings before and after the respective member access operators as the hierarchical character string of the first hierarchy to the hierarchical character string of an (n+1)th hierarchy if the counted number of member access operators is n (natural number).

2. The data processing system according to claim 1, wherein the member access operator is a dot operator as a direct reference operator in a C language.

3. The data processing system according to claim 1, wherein the member access operator is an arrow operator as an indirect reference operator in the C language.

4. The data processing system according to claim 1, wherein the data processing device further includes a display control unit that displays an input character string input from the input device on the display device under control, and
wherein the display control unit displays guide information searched and acquired from the hierarchical database by the database access unit on the display device in association with the hierarchical character string of the hierarchy number together with the input character string.

5. The data processing system according to claim 4, wherein the database access unit searches the hierarchical database on the basis of the hierarchical character string and the hierarchy number every time the code analysis unit acquires one hierarchical character string for the input character strings created by the code edition unit, and
wherein the display control unit displays guide information searched and acquired by the database access unit on the display device in association with the hierarchical character string of the hierarchy number together with the input character string.

6. The data processing system according to claim 1, wherein the code analysis unit counts the number of member access operators included in the input character string created by the code edition unit, acquires the input character string as the hierarchical character string of a first hierarchy if the counted number of member access operators is 0, acquires the character string of the input character strings before the member access operator as the hierarchical character string of a first hierarchy, and the character string subsequent to the member access operator as the hierarchical character string of a second hierarchy if the counted number of member access operators is 1, and acquires the character string before a first member access operator as the hierarchical character string of a first hierarchy, the character string before a second member access operator as the hierarchical character string of a second hierarchy, and the character string subsequent to the second member access operator as the hierarchical character string of a third hierarchy if the counted number of member access operators is 2.

7. The data processing system according to claim 6, wherein the hierarchical database includes a first hierarchy having a module name as a search key, a second hierarchy forming a lower hierarchy of the module name and having a register name as the search key, and a third hierarchy forming a lower hierarchy of the register name and having a bit name as the search key, and has information on the register manual of the data processing LSI as the guide information.

8. The data processing system according to claim 6, wherein the hierarchical database includes a first hierarchy having a class name of module operation as a search key, a second hierarchy forming a lower hierarchy of the class name of the module operation and having a class name of the register operation as the search key, and a third hierarchy forming a lower hierarchy of the class name of the register operation and having a bit operation function name as the search key, and has information on the manual of the library function for the register operation as the guide information.

9. An input support method in which a data processing device that conducts program processing inputs characters for describing a software program from an input device, and acquires and displays guide information from a hierarchical database comprising the steps of:
editing data;
analyzing code;
accessing to a database;
and controlling display, wherein the code editing step couples the character input from the input device together to create an input character string, wherein if the input character string created by the code editing step is a parameter of a program language, the code analyzing step divides the input character string for each of number of hierarchies on the basis of the number of hierarchies sectioned by a member access operator indicative of an access to a member of a structure or a class to acquire hierarchical character strings and hierarchy numbers thereof,
wherein the database accessing step searches a corresponding hierarchy of the hierarchical database with the hierarchical character string as a search key for each of the hierarchy numbers acquired by the code analyzing step, and acquires guide information corresponding to the hierarchical character string,
wherein the display controlling step displays the guide information acquired from the hierarchical database by the database accessing step on the display device in association with the hierarchical character string of the hierarchy number together with the input character string, and wherein the code analyzing step counts the number of member access operators included in the input character string created by the code editing step, acquires the input character string as the hierarchical character string of a first-hierarchy if the counted number of member access operators is zero, and sequentially acquires the character strings of the input character strings before and after the respective member access operators as the hierarchical character string of the first hierarchy to the hierarchical character string of an (n+1)th hierarchy if the counted number of member access operators is n (natural number).

10. The input support method according to claim 9, wherein the member access operator is a dot operator as a direct reference operator in a C language.

11. The input support method according to claim 9, wherein the member access operator is an arrow operator as an indirect reference operator in the C language.

12. The input support method according to claim 9, wherein the database accessing step searches the hierarchical database on the basis of the hierarchical character string and the hierarchy number every time one hierarchical character string is acquired from the input character strings created by the code editing step in the code analyzing step, and wherein the display control step displays guide information searched and acquired by the database accessing step on the display device in association with the hierarchical character string of the hierarchy number together with the input character string every time the guide information is acquired.

13. The input support method according to claim 9, wherein the code analyzing step counts the number of member access operators included in the input character string created by the code editing step, acquires the input character string as the hierarchical character string of a first hierarchy if the counted number of member access operators is zero, acquires the character string of the input character strings before the member access operator as the hierarchical character string of a first hierarchy, and the character string subsequent to the member access operator as the hierarchical character string of a second hierarchy if the counted number of member access operators is 1, and acquires the character string before a first member access operator as the hierarchical character string of a first hierarchy, the character string before a second member access operator as the hierarchical character string of a second hierarchy, and the character string subsequent to the second member access operator as the hierarchical character string of a third hierarchy if the counted number of member access operators is 2.

14. The input support method according to claim 13, wherein the hierarchical database includes a first hierarchy having a module name as a search key, a second hierarchy forming a lower hierarchy of the module name and having a register name as the search key, and a third hierarchy forming a lower hierarchy of the register name and having a bit name as the search key, and has information on the register manual of the data processing LSI as the guide information.

15. The input support method according to claim 13, wherein the hierarchical database includes a first hierarchy having a class name of module operation as a search key, a second hierarchy forming a lower hierarchy of the class name of the module operation and having a class name of the register operation as the search key, and a third hierarchy forming a lower hierarchy of the class name of the register operation and having a bit operation function name as the search key, and has information on the manual of the library function for the register operation as the guide information.

16. A non-transitory computer readable medium storing an input support program for causing a computer device to execute a process of inputting characters for describing a software program from an input device, and guide information is acquired from a hierarchical database, and displayed, the input support program controlling a code edition process, a code analysis process, a database access process, and a display control process, wherein the code edition process couples the characters input from the input device together to create an input character string, wherein if the input character string created by the code edition process is a parameter of a program language, the code analysis process divides the input character string for each of the number of hierarchies on the basis of the number of hierarchies sectioned by a member access operator indicative of an access to a member of a structure or a class to acquire hierarchical character strings and hierarchy numbers thereof, wherein the database access process searches a corresponding hierarchy of the hierarchical database with the hierarchical character string as a search key for each of the hierarchy numbers acquired by the code analysis process, and acquires guide information corresponding to the hierarchical character string, wherein the display control processes displays the guide information acquired from the hierarchical database by the database access process on the display device in association with the hierarchical character string of the hierarchy number together with the input character string, and wherein the code analyzing step counts the number of member access operators included in the input character string created by the code editing step, acquires the input character string as the hierarchical character string of a first hierarchy if the counted number of member access operators is zero, and sequentially acquires the character strings of the input character strings before and after the respective member access operators as the hierarchical character string of the first hierarchy to the hierarchical character string of an (n+1)th hierarchy if the counted number of member access operators is n (natural number).

17. The non-transitory computer readable medium storing the input support program according to claim 16, wherein the member access operator is a dot operator as a direct reference operator in a C language.

18. The non-transitory computer readable medium storing the input support program according to claim 16, wherein the member access operator is an arrow operator as an indirect reference operator in the C language.

* * * * *